United States Patent [19]

Booth et al.

[11] Patent Number: 4,851,079
[45] Date of Patent: Jul. 25, 1989

[54] PRODUCING LITHIUM NIOBATE WAVEGUIDE STRUCTURES

[75] Inventors: Richard C. Booth, Woodbridge; Alan R. Beaumont, Ipswich, both of England

[73] Assignee: British Telecommunications Public Limited Company, Great Britain

[21] Appl. No.: 942,889

[22] Filed: Dec. 17, 1986

[30] Foreign Application Priority Data

Dec. 19, 1985 [GB] United Kingdom ............... 8531262

[51] Int. Cl.[4] .............................................. C23F 1/00
[52] U.S. Cl. .................................... 156/643; 156/646; 156/656; 156/659.1
[58] Field of Search ............... 156/630, 643, 644, 646, 156/659.1, 664, 656; 350/320; 427/163, 164

[56] References Cited

U.S. PATENT DOCUMENTS 4,403,827 9/1986 Bryan et al. ...................... 350/320
4,598,039 7/1986 Fishcher et al. .................. 156/643

Primary Examiner—Kenneth M. Schor
Attorney, Agent, or Firm—Nixon & Vanderhye

[57] ABSTRACT

An improved method producing a lithium niobate waveguide device is described, and comprises;
(i) providing an optical waveguide path on a lithium niobate substrate;
(ii) depositing a layer of dielectric material on the substrate;
(iii) depositing a layer of conducting material on the dielectric layer;
(iv) defining one or more electrode tracks on the conducting layer using a suitable mask; and
(v) dry etching using an auto-registered process to remove the unmasked regions of the conducting layer and dielectric layer using a suitable etching medium.

5 Claims, 1 Drawing Sheet

PRODUCING LITHIUM NIOBATE WAVEGUIDE STRUCTURES

BACKGROUND OF THE INVENTION

The present invention relates to lithium niobate waveguide structures, particularly optical waveguide structures.

Lithium niobate waveguide devices provide, inter alia, a convenient way of implementing optical devices which require, for example, crossing, switching or combining of two or more waveguides. A lithium niobate device basically comprises a lithium niobate substrate (which may typically be of the order of 0.5–1 mm thick, 3–10 mm in breadth and 10–80 mm in length) with optical waveguides being provided in the substrate along selected paths of modified refractive index. The refractive index of the substrate may be modified along these paths, for example, by indiffusion of a titanium dopant, thereby raising the refractive index of the path above that of the adjacent substrate and creating an optical waveguide. The optical properties of such a waveguide can then be varied by the application of an electric field. This electro-optic effect enables the important use of lithium niobate devices as modulators and switches, for example. To take advantage of this electro-optic effect, suitable electrodes, commonly of aluminium or gold on chromium, must be deposited on the substrate.

In order to impose an electric field on the waveguide in a particular orientation, it may be desirable to provide an electrode directly above the waveguide itself. However, where an electrode is directly deposited on the waveguide, the evanescent optical field from the waveguide can be absorbed into the metallic layer, causing a high propagation loss in the tranverse magnetic TM mode.

To avoid this problem it is known to separate the metallic electrodes from the waveguide by interposing a layer of dielectric material, for example, silicon dioxide, of sufficient thickness between the waveguide and the electrode thus preventing the absorption loss. However, when more than one electrode is provided on a single dielectric layer, other deleterious effects, including leakage currents, for example, may be induced in the dielectric. Consequently, again, device performance can be severely degraded.

SUMMARY OF THE INVENTION

It is an object of the present invention to provide an improved method of producing lithium niobate waveguide devices which avoids or at least mitigates the abovementioned problems.

According to the present invention an improved method of producing a lithium niobate waveguide device comprises the steps of (i) providing an optical waveguide path on a lithium niobate substrate;

(ii) depositing a layer of dielectric material on the substrate;

(iii) depositing a layer of conducting material on the dielectric layer;

(iv) defining one or more electrode tracks on the conducting layer using a suitable mask; and (v) dry etching to remove the unmasked regions of the conducting layer and the dielectric layer underlying said regions in an auto-registered process using a suitable etching medium.

Preferably, the dry etching process at step (v) is a plasma etching process undertaken in a single step.

Preferably also, the etching medium used in such a process is a self-stopping agent in that it does not significantly erode the lithium niobate substrate.

The plasma etching medium preferably comprises carbon tetrachloride ($CCl_4$).

During step (ii) the dielectric insulating properties may conveniently be improved by annealing of the dielectric.

BRIEF DESCRIPTION OF THE DRAWINGS

The invention will now be described further by way of example with reference to the accompanying drawings, in which.

DETAILED DESCRIPTION OF AN EXEMPLARY EMBODIMENT

Figure 1:
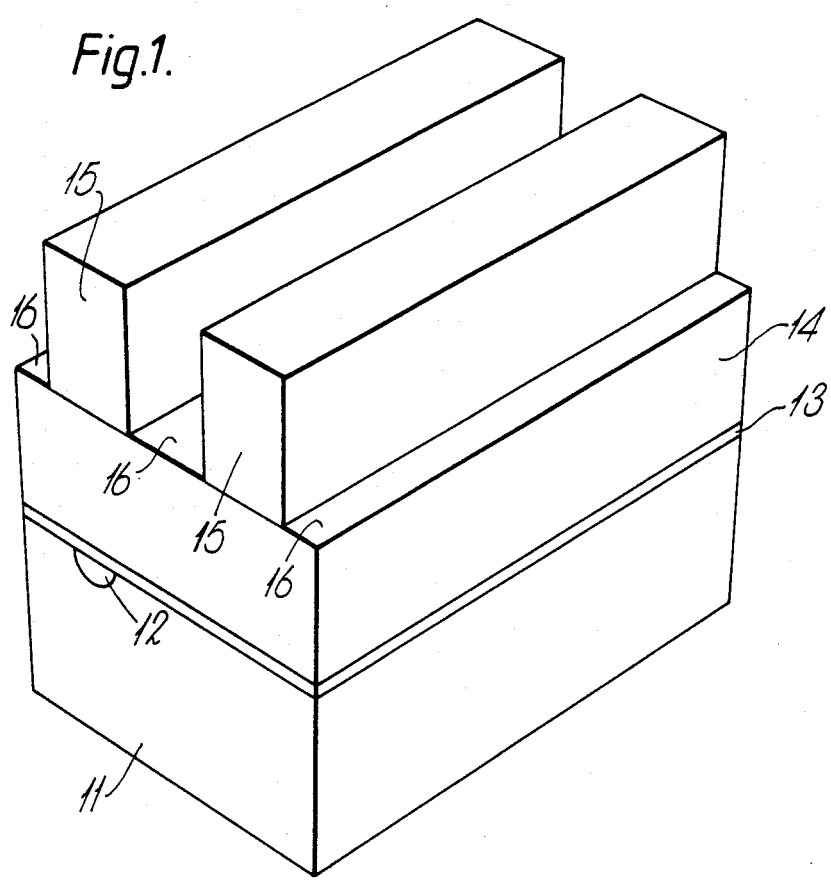
FIG. 1 is a perspective schematic view of a partially completed lithium niobate device.

Referring to FIG. 1, a partially completed lithium niobate waveguide device 1 comprises a waveguide region 12 in a lithium niobate substrate 11. A layer of dielectric 13, such as, for example, silicon dioxide, is deposited on the substrate, and a conducting layer 14 is deposited on the dielectric layer 13. The conducting layer 14 will typically comprise aluminium, or gold on chromium, or gold on titanium, or some other suitable conductive material.

To form the electrodes on the device it is necessary to etch away unwanted areas of the conducting layer 14. A mask is therefore fabricated over the conducting layer 14 such that the electrode areas are defined by etch resist material 15, for example, a photo resist. The remaining areas 16 not designated as electrodes are unprotected from the etchant. These unwanted remaining areas of the conducting layer and the dielectric underlying these areas are then removed in a single dry plasma etch processing step. Such a single step process, where a single masking is made on the conductive layer and this combination is then effective for registering the etching regions of the underlying dielectric without significant undercutting by the etchant, may be termed an auto-registered process. In the examples, the etchant comprised $CCl_4$. Ideally, the etchant employed is self-stopping, in that it does not substantially affect the lithium niobate substrate. Under the etching conditions specified below, the $CCl_4$ based plasma fulfils this requirement.

Figure 2:
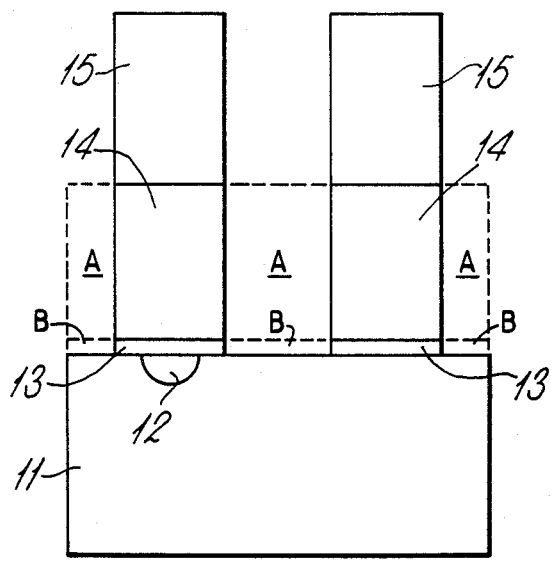
FIG. 2 is a section through the device of FIG. 1 after completion of step (v) of the method of the present invention.

FIG. 2 shows in cross section a schematic of the device of FIG. 1 after etching; areas A represent the removed conducting layer; areas B represent the removed dielectric layer.

EXAMPLES

A 'Plasma Technology' Model PE-80 planar etch system, with a liquid nitrogen cryotrap and a $CCl_4$ vapour etchant reservoir, was used in performing step (v). The etching area was 490 $cm^2$. Electrode separation was 5 cm. A two stage rotary pump was used at a pumping speed of ca.42.5 $m^3$/hr (ca.700 l/Min). Operating parameters and results are tabulated below for two examples. An indication of the potential practical ranges for use in the method of the present invention with the particular equipment and under the conditions specified is also given:

| Example: | 1 | 2 | Practical Range |
|---|---|---|---|
| Plasma Generating RF (KHZ) | 105 | 105 | 50-150 |
| Substrate Temperature (°C.) | 30 | 30 | 0-60 |
| RF Power Input (W) | 100 | 300 | 10-1000 |
| Chamber Pressure (millitor) | 85 | 200 | 10-500 |
| CCl$_4$ Flowrate (cc/min) | 20 | 20 | 1-200 |
| Etch Rates (micrometers/min): | | | |
| Aluminium | 0.1 | 0.5 | |
| Silicon dioxide | 0.01 | 0.03 | |
| Photoresist | 0.1 | 0.15 | |
| Lithium niobate less than | 0.001 | 0.003 | |

It will be appreciated that the present auto-registered process offers clear advantages over conventional wet-etch techniques previously employed in the construction of lithium niobate optical devices. In such techniques, for example, phosphoric acid has been used to etch away the unwanted material in the conducting layer 14. In order to remove the dielectric material in areas not supporting electrodes a second wet-etchant, for example, hydrofluoric acid had to be employed, with a second masking stage commonly being needed to avoid damage to the electrodes during this second stage.

We claim:

1. A method of producing a lithium niobate waveguide device, the method comprising the steps of
   (i) providing an optical waveguide path in the surface of lithium niobate substrate;
   (ii) depositing a layer of dielectric material on the substrate to directly cover at least a portion of said waveguide;
   (iii) depositing a layer of conducting material on the dielectric layer;
   (iv) defining electrode tracks on the conducting layer using a suitable etch mask which mask covers the portions of the conducting layer which are to become the electrodes; and
   (v) dry etching using an auto-registered process to remove the unmasked regions of the conducting layer and to remove the dielectric layer beneath the unmasked regions of the conducting layer using a suitable etching medium such that said electrodes are formed isolated from each other to the extent that said electrodes have no interconnection via said dielectric material.

2. A method according to claim 1 wherein the etching process in step (v) is a plasma etching process.

3. A method according to claim 1 or 2 wherein the etching medium is self-stopping in that it does not substantially erode the lithium niobate substrate.

4. A method according to claim 1 or 2 wherein the etching medium comprises carbon tetrachloride.

5. A method according to claim 1 or 2 wherein as a part of step (ii), the dielectric material is further prepared by annealing.

* * * * *